US012230926B2

(12) United States Patent
Zi et al.

(10) Patent No.: US 12,230,926 B2
(45) Date of Patent: Feb. 18, 2025

(54) CABLE ASSEMBLY WITH SHIELDING AND GROUNDING FEATURES ATTACHED TO A PAIR OF SIDE PLATES

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventors: Haozhe Zi, Irvine, CA (US); Terrance F. Little, Fullerton, CA (US); Richard Lee Malehorn, II, York, PA (US)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 374 days.

(21) Appl. No.: 17/718,511

(22) Filed: Apr. 12, 2022

(65) Prior Publication Data

US 2022/0329014 A1 Oct. 13, 2022

Related U.S. Application Data

(60) Provisional application No. 63/201,111, filed on Apr. 13, 2021.

(51) Int. Cl.
*H01R 13/6587* (2011.01)

(52) U.S. Cl.
CPC ................................ *H01R 13/6587* (2013.01)

(58) Field of Classification Search
CPC ............ H01R 13/6587; H01R 13/6593; H01R 13/6594; H01R 12/75
See application file for complete search history.

(56) References Cited

U.S. PATENT DOCUMENTS

| | | | | |
|---|---|---|---|---|
| 8,845,364 | B2 | 9/2014 | Wanha et al. | |
| 9,011,177 | B2 | 4/2015 | Lloyd | |
| 10,680,364 | B2 | 6/2020 | Champion et al. | |
| 11,189,943 | B2 | 11/2021 | Zerebilov et al. | |
| 11,245,229 | B2 | 2/2022 | Ellison | |
| 11,785,731 | B1 * | 10/2023 | Morgan | H05K 5/0026 174/545 |
| 2006/0194458 | A1 * | 8/2006 | Miyazaki | H01R 4/024 439/83 |
| 2018/0358752 | A1 | 12/2018 | Ellison | |
| 2019/0245288 | A1 | 8/2019 | Lloyd et al. | |
| 2020/0083627 | A1 | 3/2020 | Peloza et al. | |
| 2020/0366017 | A1 * | 11/2020 | Blackburn | H01R 13/6594 |
| 2021/0044040 | A1 | 2/2021 | Zheng et al. | |
| 2021/0075143 | A1 | 3/2021 | Laurx et al. | |
| 2021/0126404 | A1 * | 4/2021 | Laurx | H01R 12/7005 |
| 2021/0167534 | A1 * | 6/2021 | Song | H01R 13/40 |

(Continued)

FOREIGN PATENT DOCUMENTS

| | | |
|---|---|---|
| CN | 113328296 A | 8/2021 |

*Primary Examiner* — Hae Moon Hyeon
(74) *Attorney, Agent, or Firm* — Ming Chieh Chang

(57) ABSTRACT

A cable assembly includes: a cable module including plural cables, a ground bar electrically connected to the cables, signal contacts electrically connected to the cables, and a shielding sheet shielding the signal contacts; a housing holding the cable module; and a pair of side plates coupled to the ground bar and the shielding sheet.

15 Claims, 13 Drawing Sheets

(56) References Cited

U.S. PATENT DOCUMENTS

| | | | | |
|---|---|---|---|---|
| 2021/0194183 | A1 | 6/2021 | Guo | |
| 2021/0234291 | A1 * | 7/2021 | Zerebilov | H01R 12/75 |
| 2021/0408706 | A1 * | 12/2021 | Little | H01R 12/716 |
| 2022/0271454 | A1 * | 8/2022 | Little | H01R 13/6471 |
| 2022/0329032 | A1 * | 10/2022 | Little | H01R 12/75 |

* cited by examiner

CABLE ASSEMBLY WITH SHIELDING AND GROUNDING FEATURES ATTACHED TO A PAIR OF SIDE PLATES

CROSS REFERENCE TO RELATED APPLICATIONS

This application claims the benefit of, and priority to, U.S. Provisional Patent Application No. 63/201,111, filed Apr. 13, 2021, the contents of which are incorporated entirely herein by reference.

BACKGROUND OF THE INVENTION

1. Field of the Invention

The present invention relates to a cable assembly especially to a direct mate cable assembly, which comprises a cable module including plural cables, a ground bar electrically connected to the cables, and signal contacts electrically connected to the cables, and a housing holding the cable module.

2. Description of Related Arts

U.S. Patent Application Publication No. 2020/0366017 discloses a communication system comprising a circuit board including ground contacts and signal contacts on an upper surface thereof and a cable assembly including a cable module and a housing holding the cable module. The cable module includes plural cables, a ground shield electrically connected to shields of the cables, and signal contacts electrically connected to conductors of the cables. The ground shield includes ground beams configured to be coupled to corresponding circuit board ground contacts. Each signal contact has a terminating pad terminated to corresponding cable conductor and a signal beam configured to be coupled to corresponding circuit board signal contact on the circuit board. The housing has a mounting end mounted to the circuit board and includes contact channels receiving the ground beams and the signal beams.

SUMMARY OF THE INVENTION

An object of the invention is to provide a cable assembly with improved shielding and grounding performance.

To achieve the above-mentioned object, a cable assembly comprises: a cable module including plural cables, a ground bar electrically connected to the cables, plural signal contacts electrically connected to the cables, and a shielding sheet shielding the signal contacts; a housing holding the cable module; and a pair of side plates coupled to the ground bar and the shielding sheet.

Other objects, advantages and novel features of the invention will become more apparent from the following detailed description when taken in conjunction with the accompanying drawings.

DETAILED DESCRIPTION OF THE PREFERRED EMBODIMENT

Figure 1:
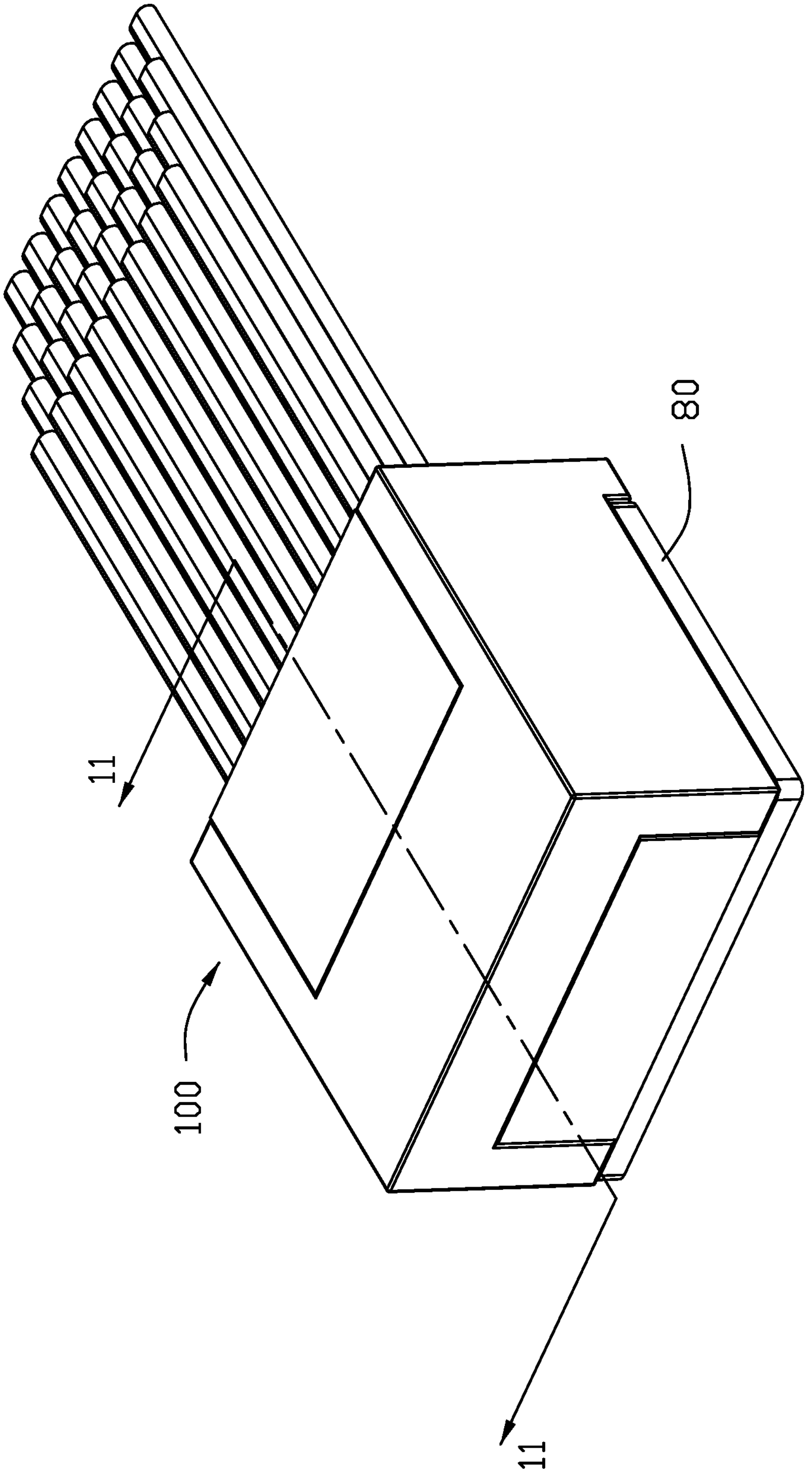
FIG. 1 is a perspective view of a cable assembly in accordance with the present invention mounted on a printed circuit board (PCB) with a cover.
Figure 2:
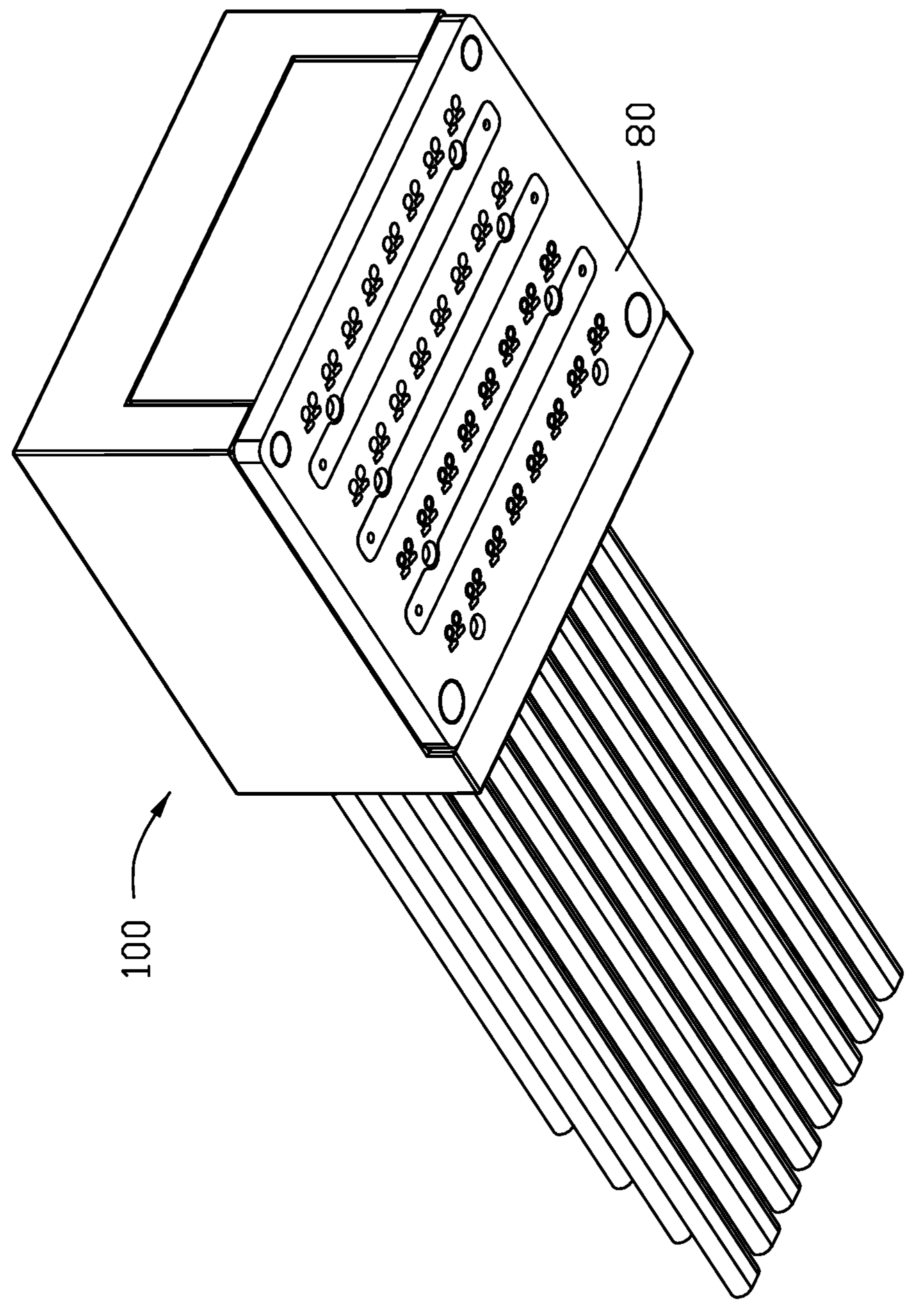
FIG. 2 is a view similar to FIG. 1 but from another perspective.
Figure 3:
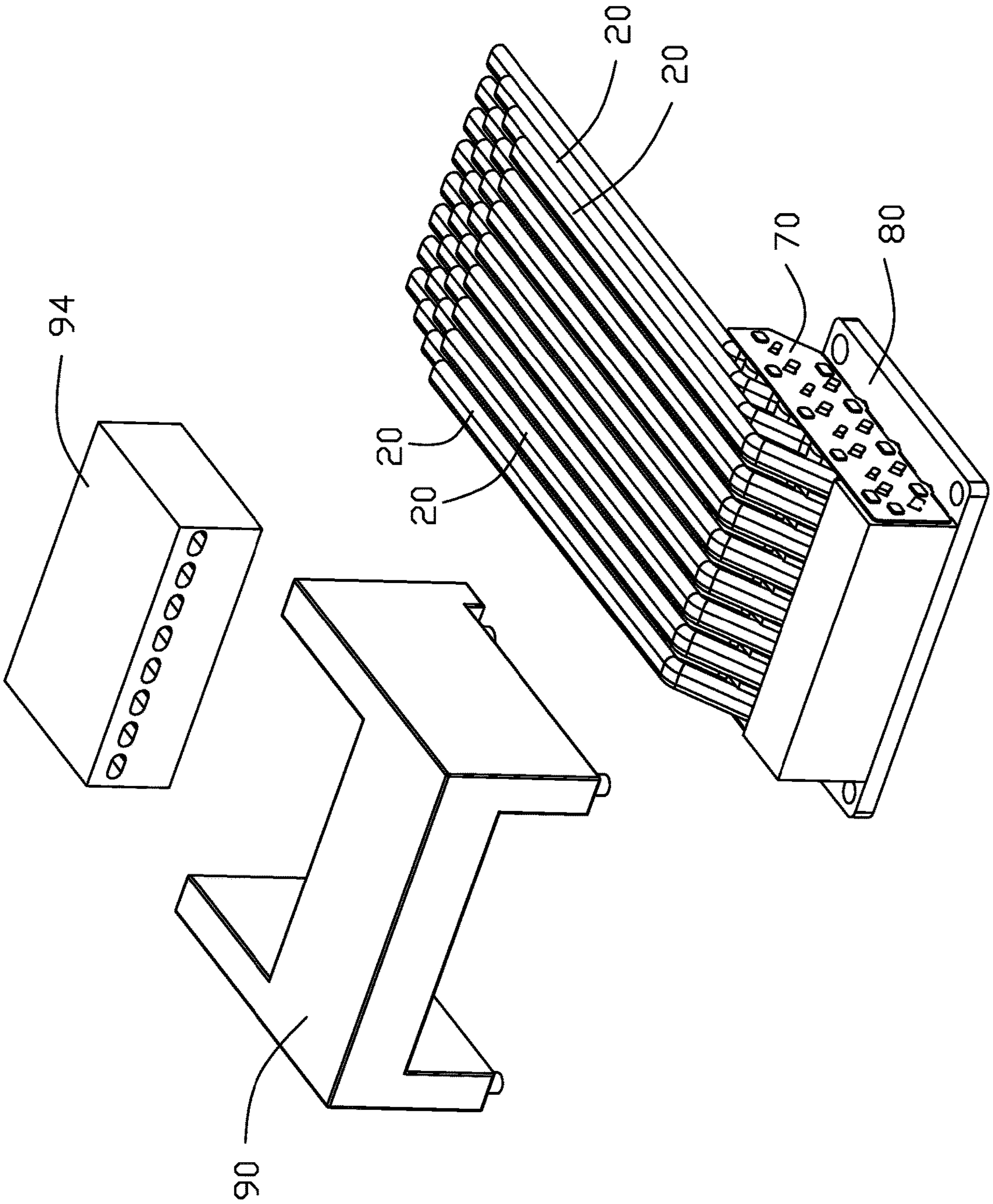
FIG. 3 is an exploded view of FIG. 1.
Figure 4:
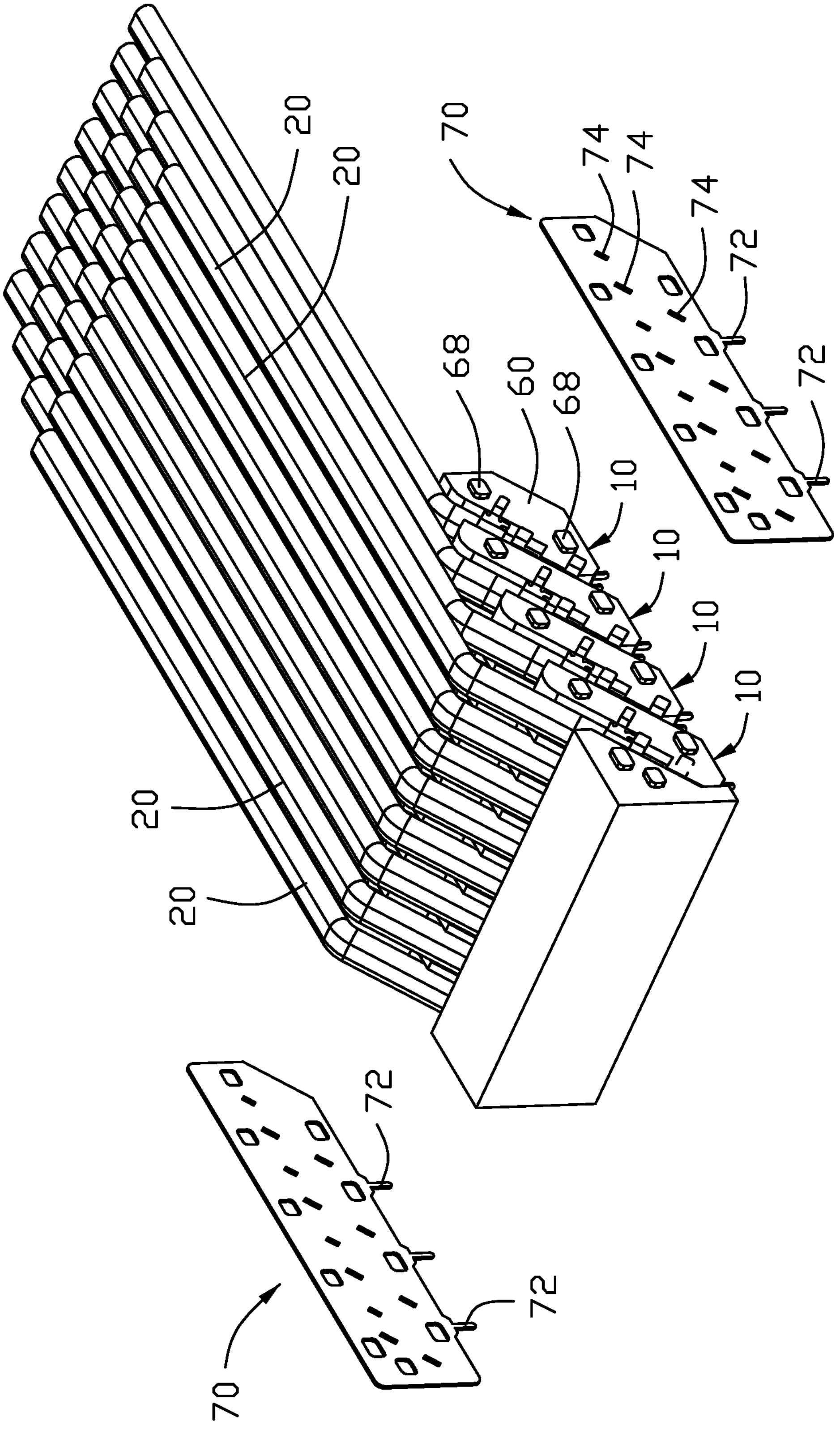
FIG. 4 is a further exploded view of FIG. 3 omitting the cover and the PCB.
Figure 5:
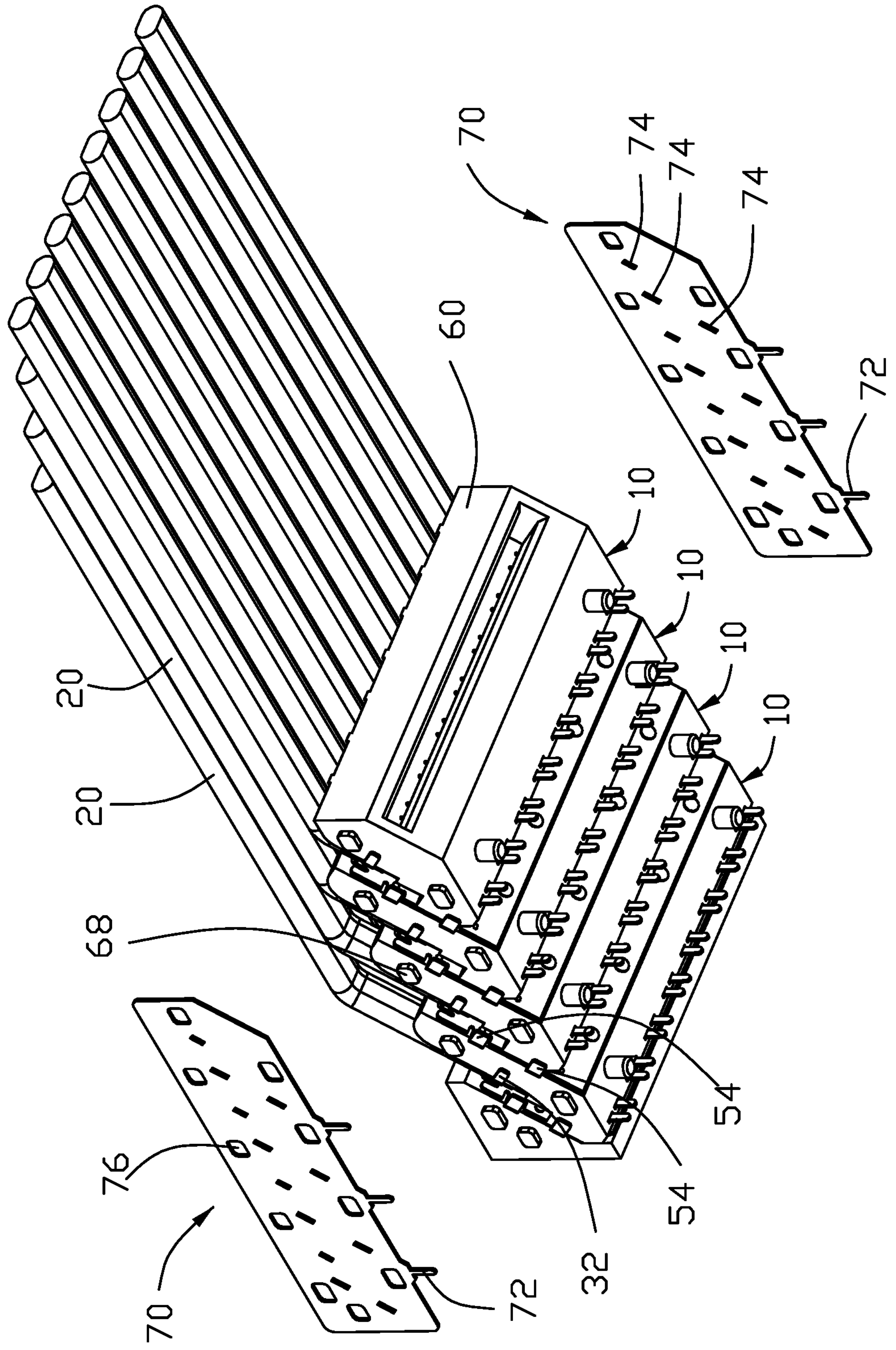
FIG. 5 is a view similar to FIG. 4 but from another perspective.

Referring to FIGS. 1-13, a cable assembly 100 comprises one or more cable modules 10 each including plural cables 20, a ground bar 30 electrically connected to associated cables 20, signal contacts 40 electrically connected to the corresponding cables 20, and a shielding sheet 50 shielding associated signal contacts 40; an insulating housing 60 holding associated cable module 10; and a pair of side plates 70 coupled to the ground bars 30 and the shielding sheets 50. The cable assembly 100 is adapted to be connected to a communication component, such as a printed circuit board (PCB) 80. The cable assembly 100 is directly mated with the PCB 80. The communication component may be an integrated circuit assembly, a processor, an interposer assembly, a socket assembly, and the like, as is known in this art.

The cable assembly 100 may further include a cover 90 for assisting in locating and/or securing the cable assembly 100 to the PCB 80. The cable assembly 100 may also include an inner mold 94 that covers an area where the cables 20 are connected to the ground bar 30 and/or the shielding sheet 50. Each of the cables 20 has a center conductor, an insulator holding the center conductor, and a shield surrounding the insulator. The cables 20 are preferably arranged in pairs for differential signals transmission. The cable 20 may also be a twin-ax cable as shown where a common shield surrounds two insulators and associated center conductors. That is, each cable 20 includes a pair of center conductors 21, an inner insulator 22 surrounding the pair of center conductors 21, a metallic shielding layer 23 and an outer insulator 24 respectively concentrically arranged with one another.

The insulating housing 60 is in a slant board shape, which defines a bottom face 601 in a horizontal plane and opposite front slant face 602 and rear slant face 604, and the front and rear slant faces are angled about 45 degree to the bottom face 601. The signal contacts 40 are integrally embedded in the housing 60, the contacts 40 include upright sections 41 or PCB-inserted sections used to be inserted into the PCB 80 and connecting portions 42 or cable-soldered sections exposed upon the front slant face 602, and a middle section embedded in the housing 60.

The ground bar 30 is attached and exposed upon the front slant face 602, and extends longitudinally along the front slant face 602. The ground bar 30 has a pair of side fingers 32 for engaging with the pair of side plates 70, respectively.

Figure 6:
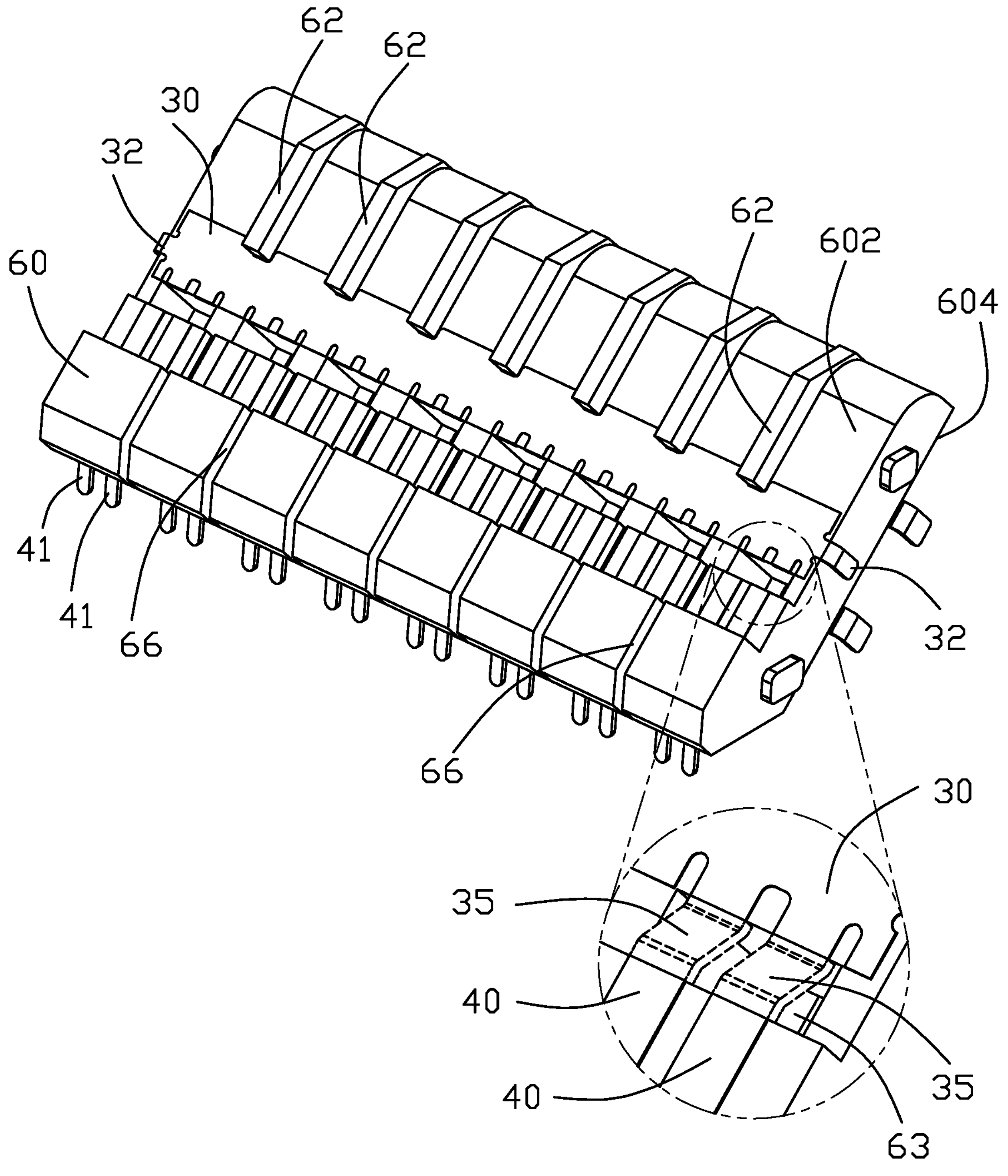
FIG. 6 is a perspective view of a housing of the cable assembly.
Figure 7:
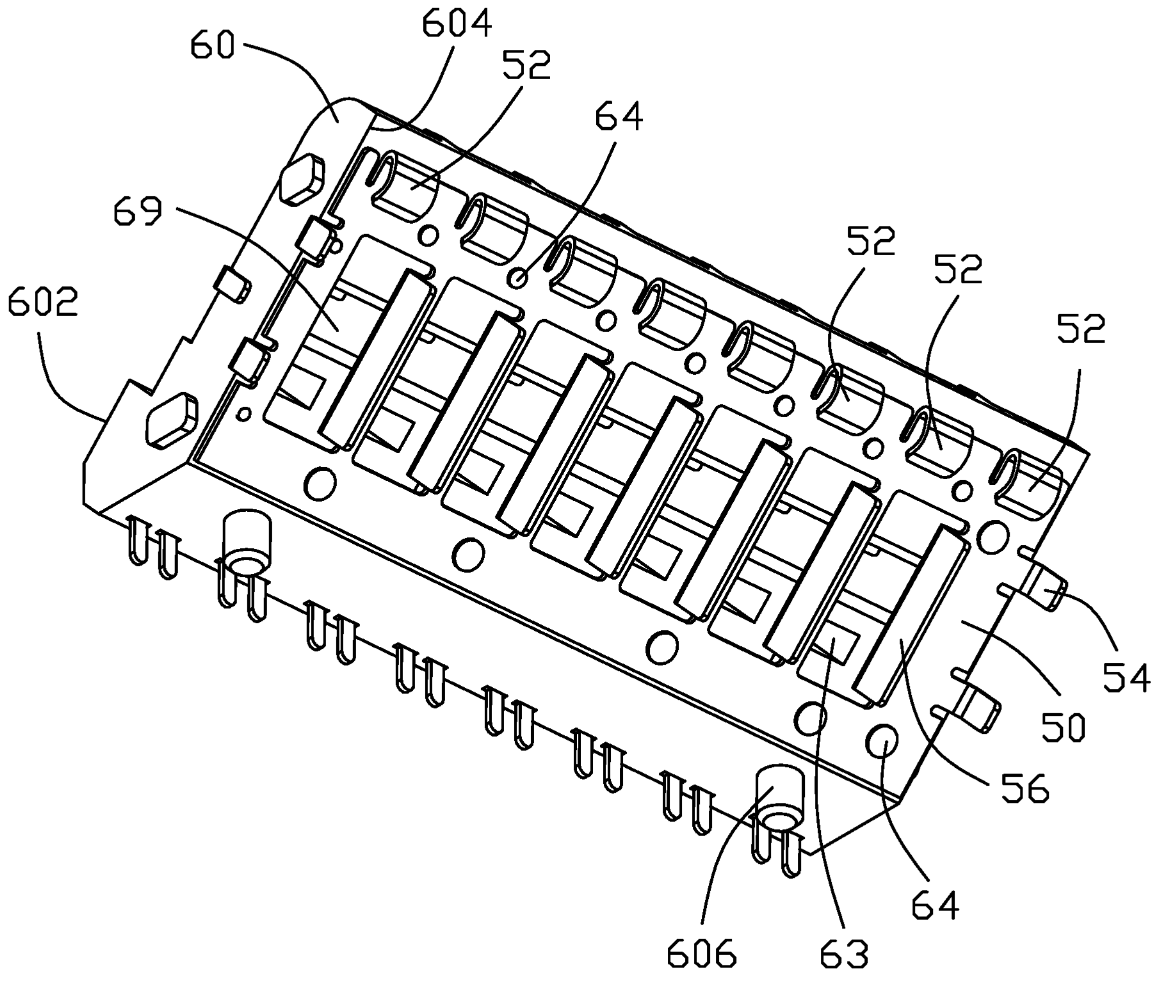
FIG. 7 is a view similar to FIG. 6 but from another perspective.
Figure 8:
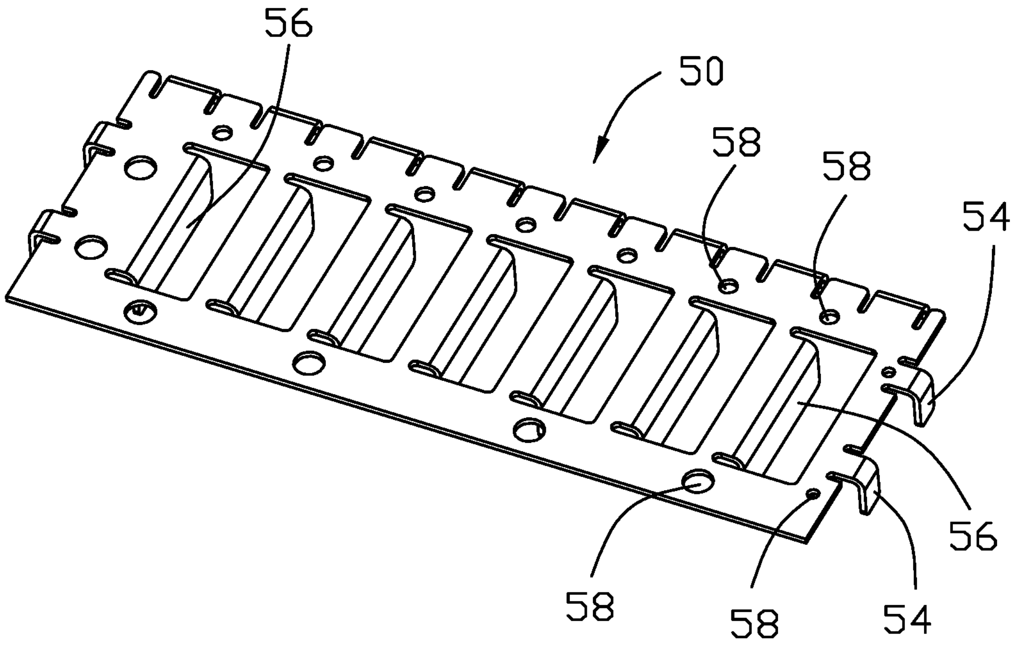
FIG. 8 is a perspective view of a shielding sheet of the cable assembly.
Figure 9:
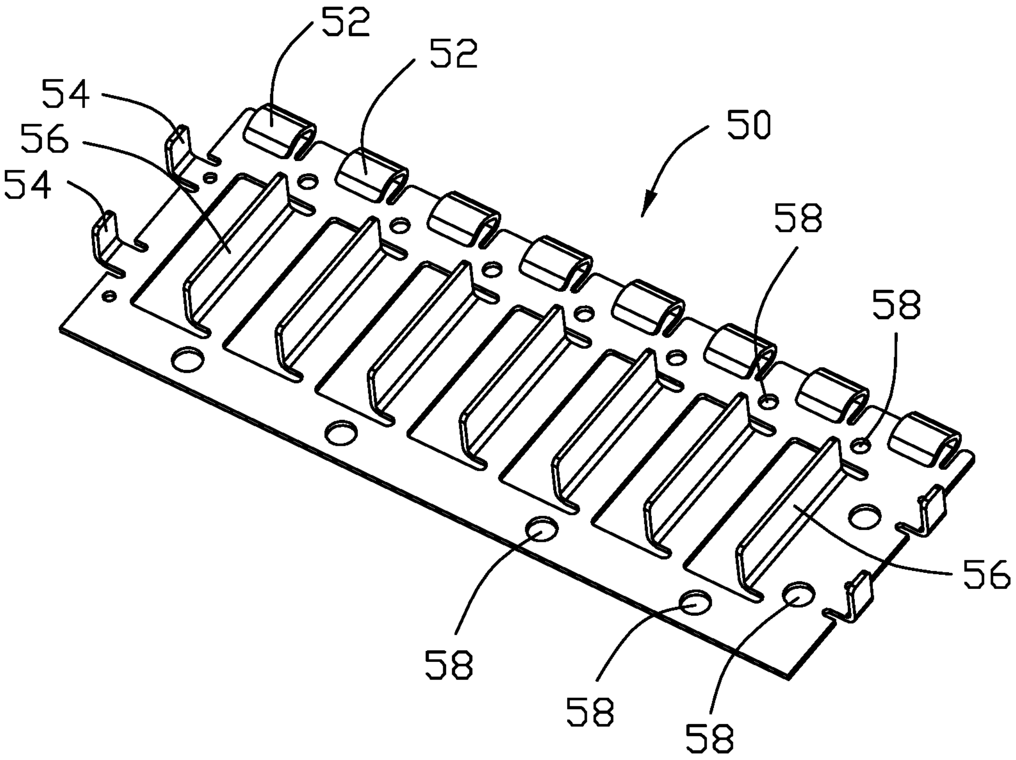
FIG. 9 is a view similar to FIG. 8 but from another perspective.
Figure 10:
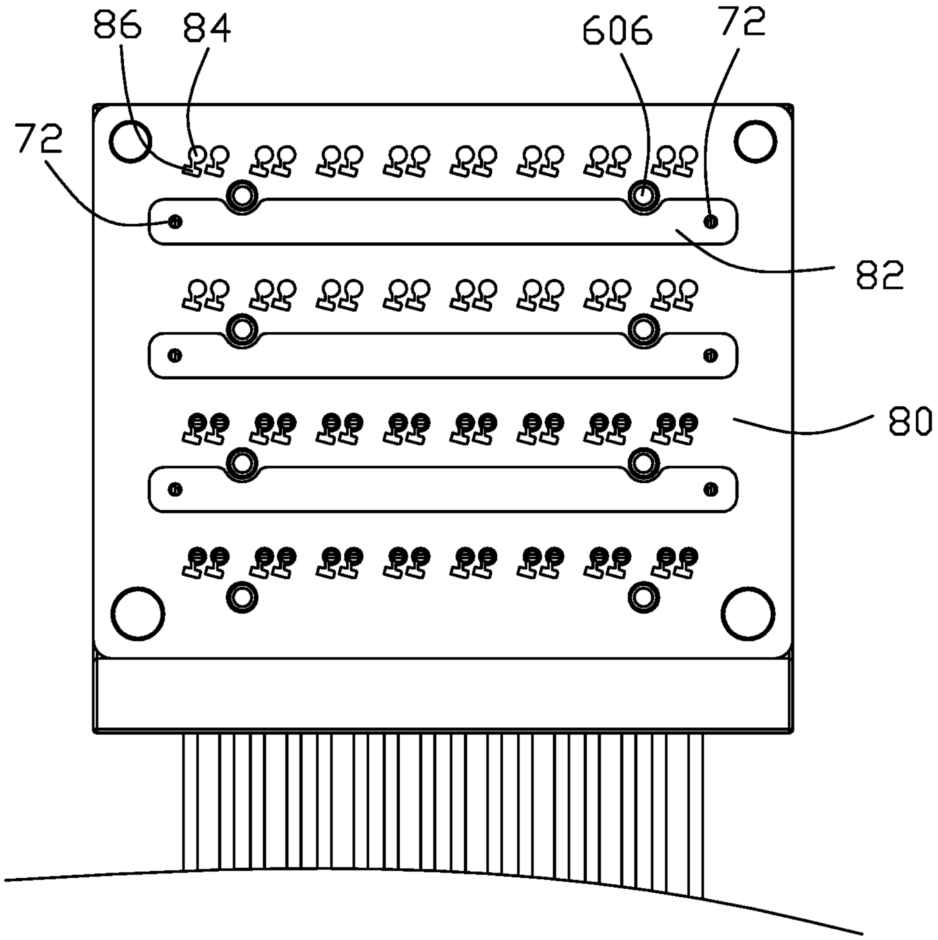
FIG. 10 is a bottom view of the cable assembly and the PCB.
Figure 11:
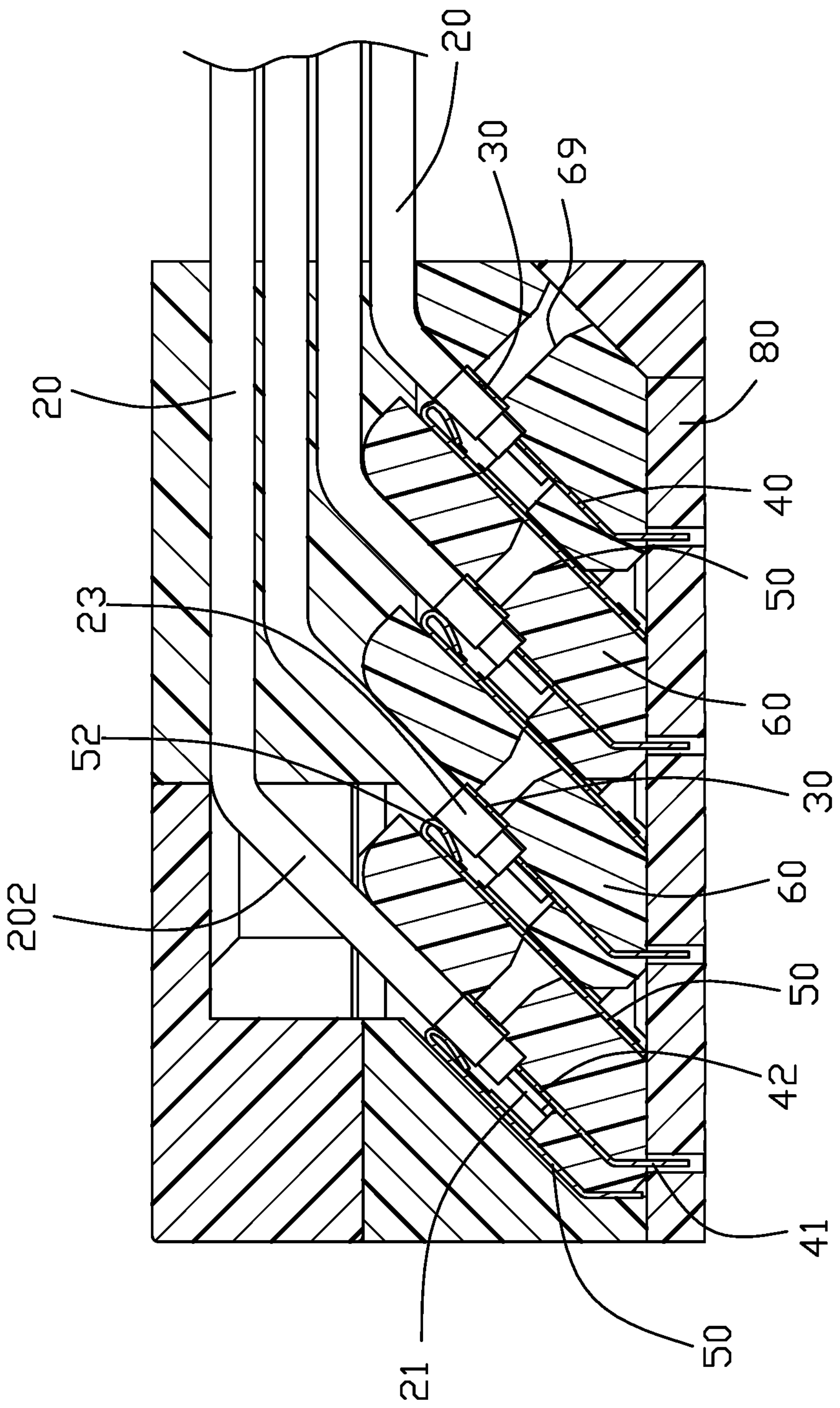
FIG. 11 is a cross-sectional view of the cable assembly and the PCB.

The ground bar 30 and the signal contacts 40 are initially carried by a same contact carrier and then bridging portions 35 thereof are cut off to separate them apart. In this embodiment, the ground bar 30 and the signal contacts 40 are integrally formed with the housing 60 by insert molding concurrently through same contact carrier and then bridging portions 35 are severed to form separate ground bar 30 and signal contacts 40, as shown in FIG. 6. For the purpose of severing, the housing 60 has corresponding holes 63 at locations below the bridging portions 35.

In conjunction with FIGS. 14-15, the center conductor 21 is mechanically and electrically connected to the connecting portion 42 of the signal contacts 40 respectively and the shielding layer 23 is sandwiched between the ground bar 30 and the neighboring cable module 10. As shown in FIGS. 3-5 and 11, a front portion 202 of the cables 20 is angled about 45 degrees to have a low profile for mating to the PCB 80. Also, as clearly shown in FIG. 6, ribs 62 are disposed on the housing 60 to assist in routing and locating the cables 20.

Referring specifically to FIGS. 7-9 and 11, the shielding sheet 50 is attached and exposed upon the rear face 604. The shielding sheet 50 has a plurality of beams 52 for resiliently engaging the shielding layers 23 of the cables 20, one or more fingers 54 on each side thereof for engaging with the side plate 70, and a plurality of bending features 56. One or more locating holes 58 may also be formed on the shielding sheet 50 for engaging corresponding studs 64 disposed on the housing 60. Though the shielding sheet 50 is shown attached to the rear slant face 604 of the housing 60, e.g., in FIGS. 6 and 7, it is noted that the shielding sheet 50 may be attached to a front slant face 602 of the housing 60 through similar holes and studs or any other attaching or fastening features. As can be understood, where there are two or more cable modules 10 as is in the embodiment shown and the shielding sheets 50 are attached to the rear slant faces 604 of the housings 60, in terms of function the shielding sheet 50 of a preceding cable module 10 is secured to the housing 60 of the next cable module 10 in effect. Specifically, in this functional arrangement, associated ground bar 30 and shielding sheet 50 are separate from each other on opposite sides of the cables 20, and the pair of side plates 70 has slits 74 coupled to the fingers 32 of the ground bar 30 and the fingers 54 of the shielding sheet 50. Each side plate 70 has a plurality of grounding legs 72.

The housing 60 has plural slots 66 between every two cables, as shown in FIG. 6, and the bending features 56 of the shielding sheet 50 enters the slots 66 to reduce cross talk between every two differential pairs of cables 20. The housing 60 also has features 68 for engaging with corresponding features 76 of the side plate 70. The housing 60 may further have a slot 69 for access of hot bar head from a rear side of the housing 60 to heat the ground bar 30 and solder the cable shielding layers 23 therewith.

Figure 12:
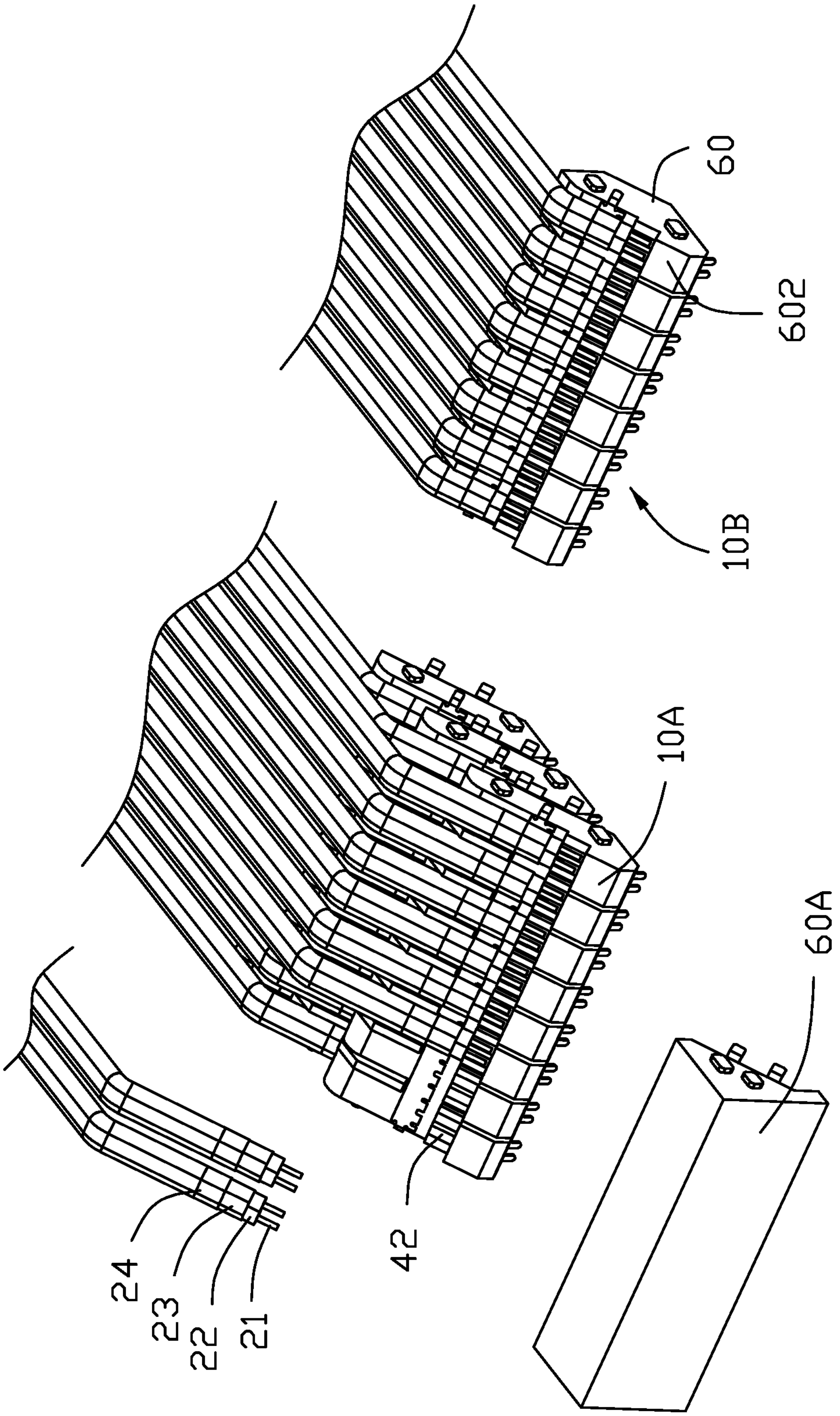
FIG. 12 is an exploded perspective view of the cable modules of FIG. 4.
Figure 13:
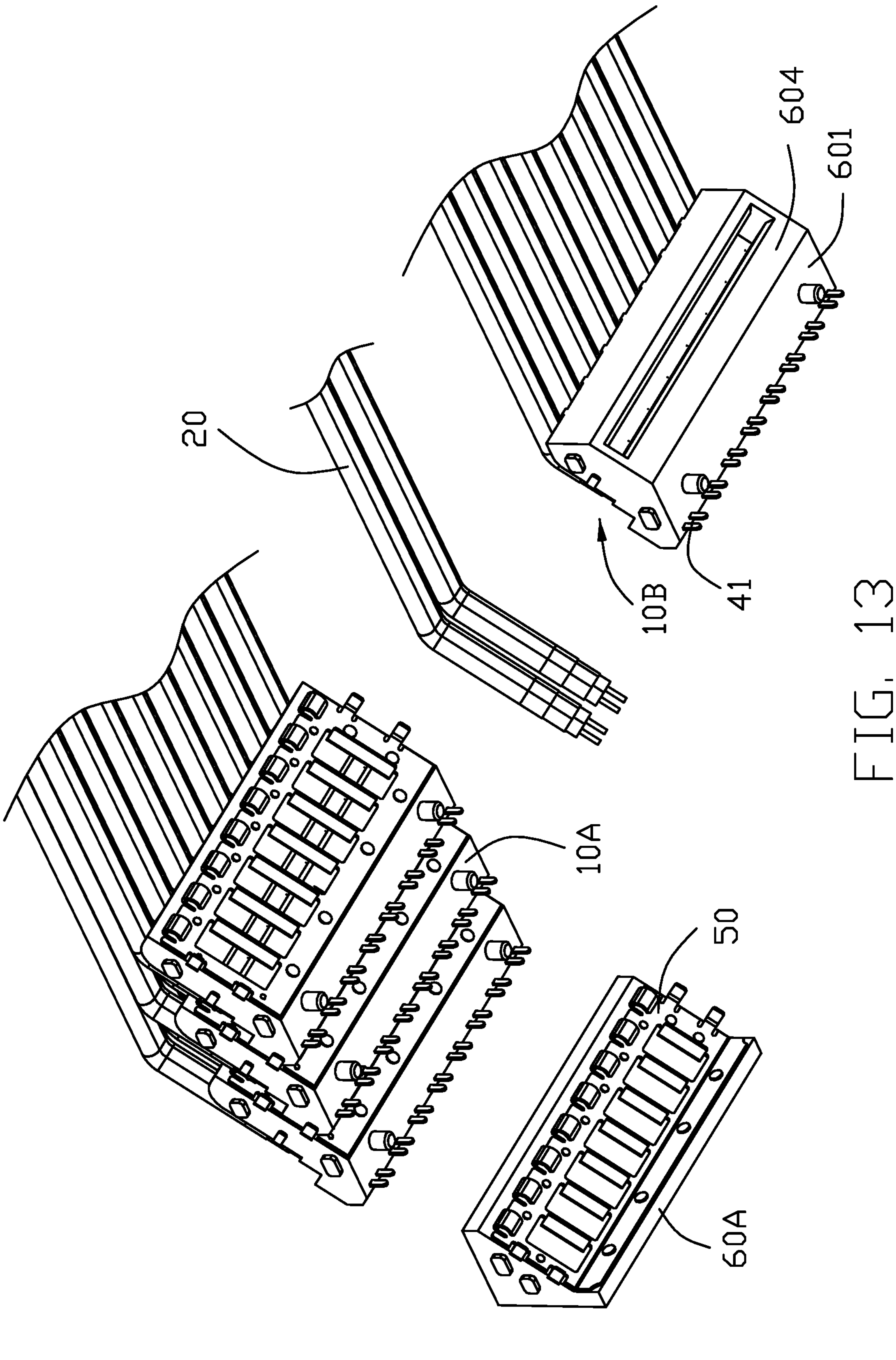
FIG. 13 is another exploded perspective view of the cable modules of FIG. 12.

As best shown in FIGS. 12 and 13, in this embodiment, the cable assembly 100 includes three first cable modules 10A, one second cable module 10B and one assisting module 60B. The first cable module each having housing with a row of signal contacts 40 and one shielding sheet 50 and cables located on the front slant face 602, and one shielding sheet 60 located on the rear face 604, the first cable module has the same structure and making process as described. The second cable module 10B has similar structure to the first cable module 10A except the shielding sheet 50. The assisting housing 60A is attached with a shielding sheet 50 attached on the rear slant face 604 of the assisting housing.

Referring specifically to FIGS. 4-5, 7, and 10, for each module 10, the housing 60 has a pair of locating posts 606 to mate with the PCB 80. This will also be the datum to locate conductive pads on the PCB 80. The PCB 80 may also have a common ground pad 82 to mate with the grounding legs 72 of the pair of side plates 70. To receive the signal contacts 40, either blind hole design or through hole design on the PCB 80 may be utilized. At the bottom side of the PCB 80 shown in FIG. 10 for mating with a socket assembly, e.g., a land grid array receptacle connector, soldering pads each may have respective soldering area 84 and touching area 86. The touching area 86 may be designed based on swiping distance and structure of receptacle contact pins.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the members in which the appended claims are expressed.

What is claimed is:

1. A cable assembly comprising:

two cable modules each comprising plural cables, a ground bar electrically connected to shielding layers of the cables, signal contacts electrically connected to center conductors of the cables, and a shielding sheet shielding the signal contacts;

a respective housing holding each of the two cable modules; and a pair of side plates coupled to the housings, the ground bars, and the shielding sheets; wherein the shielding sheet of one cable module is secured to the housing of the other cable module.

2. The cable assembly as claimed in claim 1, wherein each of the pair of side plates has a plurality of grounding legs.

3. The cable assembly as claimed in claim 1, wherein the ground bar and the shielding sheet are separate from each other.

4. The cable assembly as claimed in claim 1, wherein the housing comprises locating features engaging the pair of side plates.

5. The cable assembly as claimed in claim 1, wherein the housing has plural slots between every two cables, and the shielding sheet has plural bending features entering the slots.

6. The cable assembly as claimed in claim 1, wherein the shielding sheet has a plurality of beams resiliently engaging the shielding layers of the cables.

7. The cable assembly as claimed in claim 1, wherein a front portion of the cables is angled about 45 degrees.

8. A cable assembly comprising:

at least one cable module comprising:

a housing defining a horizontal bottom face and opposite front face and rear face, the front and faces being angled to the bottom face, a plurality of signal contacts retained in the housing and comprising upright sections extending downward from the bottom face and connecting portions exposed upon the front face of the housing;

a ground bar attached and exposed upon the front face of the housing;

a plurality of cables comprising center conductors electrically and mechanically connected to the corresponding signal contacts, respectively, and shielding layers electrically and mechanically connected to the ground bar; and a shielding sheet attached and exposed upon the rear face of the housing;

wherein the shielding sheet comprises a plurality of beams to contact the shielding layers of the cables of a neighboring cable module, respectively.

9. The cable assembly as claimed in claim 8, further comprising a pair of side plates coupled to the ground bar and the shielding sheet.

10. A cable assembly comprising at least two cable modules, each cable module comprising:

a housing defining a horizontal bottom face and opposite front face and rear face, the front and rear faces being angled to the bottom face;

a plurality of signal contacts retained in the housing and comprising upright sections extending downward from the bottom face and connecting portion exposed upon the front face of the housing;

a ground bar attached and exposed upon the front face of the housing;

a plurality of cables comprising center conductors electrically and mechanically connected to the corresponding signal contacts, respectively, and shielding layers electrically and mechanically connected to the ground bar; and a shielding sheet attached and exposed upon the rear face of the housing except a rearmost cable module of the at least two cable modules.

11. The cable assembly as claimed in claim 10, wherein each shielding sheet has a plurality of beams to contact the shielding layers of the cables of a neighboring cable module, respectively.

12. The cable assembly as claimed in claim 11, further comprising a front assisting housing which is attached with one shielding sheet on a rear face thereof, wherein the shielding sheet on the assisting housing defines a plurality of beams to contact the shielding layers of cables of a front module of said at least two cable modules.

13. The cable assembly as claimed in claim 12, wherein the housing has plural slots between every two cables, and the shielding sheet has plural bending features entering the slots.

14. The cable assembly as claimed in claim 11, further comprising a pair of side plates coupled to the ground bars and the shielding sheets.

15. A cable assembly comprising:

a cable module comprising plural cables, a ground bar electrically connected to shielding layers of the cables, signal contacts electrically connected to center conductors of the cables, and a shielding sheet shielding the signal contacts;

a housing holding the cable module; and a pair of side plates coupled to the housing, the ground bar, and the shielding sheet; wherein the housing has plural slots between every two cables, and the shielding sheet has plural bending features entering the slots.

* * * * *